United States Patent Office 3,215,200
Patented Nov. 2, 1965

3,215,200
PRODUCTION OF AQUEOUS FOAMS AND
COMPOSITIONS THEREFOR
Willard H. Kirkpatrick, Sugar Land, and Virgil L. Seale
and Richard E. Berkley, Houston, Tex., assignors to
Nalco Chemical Company, a corporation of Delaware
No Drawing. Filed Oct. 31, 1960, Ser. No. 65,940
5 Claims. (Cl. 166—44)

This invention, in general, relates to improvements in the production of aqueous foams in subterranean formations and to foaming agents useful therein. The invention has application to the production of aqueous foams in a well bore during the drilling thereof by gas or mist drilling operations. The invention also relates to the production of aqueous foams in gas wells, gas storage pools, and the like.

In the drilling of a bore into the earth with a rotary tool, it has been the almost universal practice up until recent years to circulate a liquid, such as water, oil, a water-in-oil emulsion, or an oil-in-water emulsion, usually with mud solids suspended therein, to the drilling zone during the drilling operation. One of the functions in circulating these liquids, usually in the form of a drilling mud, from the earth's surface to the drilling zone and thereafter returning the liquid to the surface is to remove from the bore the drilled solids. In recent years, some wells have been successfully drilled by a different technique in which a compressed gas, such as air, is pumped into the well and discharged in the well in the drilling zone. This compressed gas flows rapidly up the well bore around the drill string and carries with it the drilled solids. In many instances, the drilling operation is essentially a dry process inasmuch as there is essentially no liquid present in the well bore.

This invention is concerned with gas drilling where there is water present in the well bore, particularly those instances where at least 1–2 barrels and up to 60–70 barrels of water per hour are introduced into the well bore. The water introduced into the well bore comes from two primary sources. One source is water which flows into the well bore due to formation seepage of water into the well bore. Such water invasion can occur, for example, while drilling through a water bearing subterranean zone or even long after the drill has passed through and beyond the water-bearing subterranean zone.

This invention is also concerned with a drilling procedure referred to in the trade as "mist drilling." Mist drilling is a modification of dry gas drilling in which the driller introduces into the well bore a controlled quantity of water in addition to the gas medium for lifting out the drilled solids. Mist drilling differs from the afore-described fluid drilling in that in the latter instance the fluid completely fills the area between the drill string and the well bore from the drilling zone to the top of the well, while in the former instance the amount of water introduced, at most, formed a small pool in the drilling zone. The water is removed from the drilling zone in the mist drilling operation by causing it to take the form of a stable aqueous foam which has a density only a fraction of the density of the water. The compressed gas discharged in the drilling zone plus the rotation of the drilling tool gives sufficient agitation for the formation of the foam, which is thereafter carried up to the surface by the gas flowing upwardly in the well bore. The drilled solids are also carried up with the aqueous foam.

Some of the stated advantages of the gas drilling method over the more conventional mud drilling method, in those instances where the formations drilled are suitable for gas drilling operations, are increased penetration rate, longer bit life, quicker rate of return of analyz-able samples to the surface, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical and chemical alteration of the drilling fluid to meet a particular down hole condition or conditions. One difficulty in dry gas drilling where water seeps into the bore and accumulates in the drilling zone, and also in mist drilling operations, is that the drilled solids tend to ball as the drill rotates. The balled solids become too heavy to be lifted out by the gas or the aqueous foam. This problem, however, has been for the most part overcome by the introduction into the bore of antiballing agents, such as calcium stearate, zinc stearate, silica gel and others, which coat the drilled particles with a waterproof coating. The solids ball only when they are water-wettable and, therefore, the waterproof coating prevents substantial agglomeration of the drilled solids.

An object of the invention is to provide new surface-active compounds and compositions useful for production of aqueous foams.

One of the objects of this invention is to provide improvements in aqueous foam systems for removing invasion water from subterranean drilling zones during the drilling of a well by the gas drilling method.

Another object of the invention is to provide improvements in aqueous foam systems for conveying during mist drilling operations both solid particles and water from the drilling zone to the surface.

Still another object of the invention is to provide improvements in gas drilling operations where water is present in the drilling zone.

Another aspect of the invention relates to the removal of invasion water from gas wells, gas storage pools and the like. A well or storage pool often accumulates over a period of time at the botom thereof a pool of water which interferes with gas flow and causes the gas to be highly water laden. When such accumulation occurs, it is often desirable to remove the water. One procedure for doing this involves the installation of a pipe with a pump at the bottom for pumping the accumulated water to the surface. A much simpler procedure, however, has been evolved by simply injecting into the well casing a foaming agent which causes the accumulated water to foam into a stable aqueous foam which can be carried to the well surface as the gas is released from the subterranean formation and brought to the well surface. This invention is also concerned with the production of stable aqueous foams in gas wells, gas storage pools and the like for removing accumulated water from gas producing or gas storage areas.

It is, accordingly, an object of this invention to provide improvements in aqueous foam systems used to remove water from subterranean gas producing zones, subterranean gas storage zones and the like.

Foaming agents for the production of aqueous foams in subterranean formations ideally should produce light, stable foams with fresh waters which contain, at most, only minor quantities of water-soluble salts and also with saline waters which contain appreciable quantities of water-soluble salts, such as sodium chloride, calcium salts and/or magnesium salts. The surface-active foaming agents, therefore, should function well in hard waters as well as soft waters. The foaming agents used in this invention are anionic surface-active agents. Anionic surface-active agents, in general, form in the presence of calcium and/or magnesium hardness calcium and/or magnesium salts which change the surface-active properties of the anionic surface-active agent. The anionics of this invention, however, produce light, relatively stable foams in hard water as well as in soft or fresh water.

The anionic foaming agents of this invention are polyoxyethylated organic compounds having a hydrophobic organic base and a hydrophilic polyoxyethylene chain. The polyoxyethylated organic compounds are sulfated to introduce additional hydrophilicity into the polyoxyethylated chain. Other foaming agents of this invention are blends of the sulfated polyoxyethylated organic compounds with a minor quantity of a nonionic surface-active agent. The nonionic surface-active agents are polyoxyethylated organic compounds in which the organic nucleus which is polyoxyethylated is hydrophobic and the polyoxyethylene group is hydrophilic.

The sulfated foaming agents of this invention are prepared by polyoxyethylating a monohydric organic compound which as a long chain alkyl or alkenyl group which is hydrophobic or which has an alkyl aryl group which is hydrophobic. The most preferred organic compounds are aliphatic monohydric alcohols having 12–24 carbon atoms or alkyl phenols in which the alkyl group contains 8–12 carbon atoms.

These organic compounds are polyoxyethylated by conventional procedures in the presence of a basic compound, usually sodium hydroxide or potassium hydroxide. The degree of polyoxyethylation preferably falls within the range of about an average of 5 to 45 mols of oxyethylene groups per mol of the polyoxyethylated organic compound.

The sulfation of the polyoxyethylated organic compound adds a hydrophilic sulfato group to the terminal hydroxy group at the end of the polyoxyethylene chain of the polyoxyethylated organic compound. The sulfation procedure should be carried out under conditions which preclude substantial attack on the polyoxyethylene chain other than the addition of the sulfato group at the end thereof. Sulfation groups with the sulfating agents having great oxidizing activity can cause a splitting of the polyoxyethylene chains along the chain length thereof or at the juncture of the polyoxyethylene chain with the organic compound providing the hydrophobic group.

For purposes of our invention, we prefer to use sulfamic acid as the sulfating agent. Sulfamic acid is convenient and easily handled in plant operations. It also is much less oxidizing toward polyoxyethylene groups than other sulfating agents, such as sulfuric acid, sulfur trioxide and the like.

The sulfation with sulfamic acid is accomplished by heating and stirring the sulfamic acid with the polyoxyethylated compound. The temperature should reach 90–150° C. during the sulfating reaction. The mol ratio of sulfamic acid to polyoxyethylated compound should be sufficient so that at least 60% of the terminal hydroxy groups of the polyoxyethylene chains are sulfated, in which case there would be left in the reaction mixture 40% of a nonsulfated polyoxyethylene compound. This reaction mixture is a blend of the anionic sulfated surface-active agent and a nonionic surface-active agent. Sulfation may be carried to completion by using equal mol ratios of the two reactants or preferably by using a slight molar excess of the sulfamic acid.

The reaction of sulfamic acid provides sulfate groups in the ammonium salt form. Where other sulfating agents, such as sulfuric acid or sulfur trioxide are employed, sulfate groups have the acid form. They are preferably neutralized by adding to the sulfated product an alkali metal base or ammonium hydroxide to give the sodium, potassium or ammonium salt.

The active foaming ingredients can be blended thereafter with water or water-alcohol mixture to give a liquid product which is easily metered into the well. Such blending, however, is not absolutely essential.

The following examples are provided to illustrate some preferred embodiments of the invention. They also show the foaming activity of these compounds in both fresh water and saline water.

The evaluation of the foaming activity of the compounds is conducted according to the following procedure. One liter of water was placed in a cylindrical Lucite column 6 feet high with an inside diameter of 3½ inches. Air was introduced through the top of the column by means of a ½ inch pipe extending to within ½ inch of the bottom of the column. The air flow rate was set at 1.1 cubic feet per minute. The concentration of the foaming agent in the water was 0.1 weight percent. The fresh water used was ordinary tap water and the saline water was a brine formed by dissolving 1200 grams of sodium chloride, 88.8 grams of calcium chloride and 66.8 grams of magnesium chloride in 16 liters of tap water. The test was run over a period of 14 minutes and the weight of water in grams removed during that period of time in the form of a foam bubbling over the top of the column was determined by direct weighing.

In the majority of instances in the following examples urea was used to catalyze the sulfation with sulfamic acid. Aqueous ammonium hydroxide was used to bring the reaction mixture to a pH of 7 after the reaction was completed. In each instance, the reaction was carried out at the indicated reaction temperature for the indicated reaction time. The amount of water and the amount of methanol added to complete the formulation are also given with each example.

The following Examples 1–14 are presented in tabulated form. These examples identify the sulfated polyoxyethylated compound, its method of preparation, and its foaming activity in fresh and saline waters. The numbers in parentheses after the compounds in the second column indicate the average mols of ethylene oxide per mol of the polyoxyethylated compound.

*Examples 1–14*

| Ex. | Polyoxyethylated Compounds | | Urea | Grams Sulfamic Acid | Reaction Temp., °C. | Reaction Time, hr. | Gm. Water | Gm. $CH_3OH$ | Gm. Water Removed as Foam | |
|---|---|---|---|---|---|---|---|---|---|---|
| | Compound | Gm. | | | | | | | Fresh | Saline |
| 1 | Tridecyl alcohol (9.5) | 595.5 | 7 | 61.5 | 95 | 1.5 | 396 | 143 | 460 | 365 |
| 2 | Tridecyl alcohol (11.5) | 645 | 7 | 61.5 | 95 | 1.5 | 520 | 168 | 440 | 345 |
| 3 | Tridecyl alcohol (14) | 756 | 7 | 61.5 | 90 | 1.5 | 582 | 192 | 465 | 335 |
| 4 | Tridecyl alcohol (18.5) | 930 | 8 | 61.5 | 95 | 1.5 | 676 | 228 | 485 | 370 |
| 5 | Tridecyl alcohol (20.5) | 1,015 | 8 | 61.5 | 95 | 1.5 | 718 | 246 | 485 | 380 |
| 6 | Hexadecyl alcohol (27.2) | 660 | 4 | 31 | 95 | 1.5 | 483 | 119 | 380 | 260 |
| 7 | Isodecanol (15.7) | 776 | 8 | 61.5 | 95 | 1.5 | 624 | 400 | 320 | 235 |
| 8 | p-Nonyl phenol (27) | 645 | 4 | 31 | 95 | 1.5 | 436 | 100 | 390 | 310 |
| 9 | Cetyl and Stearyl Alcohols (26.1) | 642 | 4 | 31 | 95 | 1.5 | 514 | 200 | 325 | 255 |
| 10 | p-Octyl phenol (22.3) | 544 | 4 | 31 | 95 | 1.5 | 335 | 200 | 415 | 335 |
| 11 | p-Dodecyl phenol (16.6) | 600 | 5 | 40.5 | 95 | 1.5 | 394 | 150 | 410 | 355 |
| 12 | Dinonyl phenol (30.2) | 767 | 4 | 31 | 95 | 1.5 | 326 | 200 | 450 | 360 |
| 13 | Tridecyl alcohol (9.5) | 650 | | 100 | 95 | 3 | 370 | 144 | | |
| 14 | Tridecyl alcohol (9.5) | 595.5 | | 61.5 | 95 | 3 | 450 | 89 | | |

In most instances in the above examples the amount of sulfamic acid used for sulfation was insufficient to give complete sulfation of the polyoxyethylated compound. The resulting product, therefore, was a mixture of the polyoxyethylated compound (a non-ionic) and the sulfated derivative of said polyoxyethylated product (an anionic). In most instances it is preferred to use only a partial sulfated polyoxyalkylated compound, the degree of sulfation being in the order of 60–90 percent of the polyoxyalkylene compound present in the reaction mixture. A similar result can be achieved by using a totally sulfated compound and blending it with the required amount of the same compound which is not sulfated.

and nonionic blends. The anionic composition for each blend is identified by reference to a previous example. The nonionic composition is identified by the compound which is polyoxyethylated wherein the numbers in parentheses indicate the average mols of ethylene oxide per mol of polyoxyethylated compound. The nonionic composition is a blend of the polyoxyethylated compound, water and methanol in the amount stated. The relative quantities of anionic composition to nonionic composition are given as a weight ratio for Examples 15–26 and as a volume ratio for Examples 27–44.

*Examples 15–44*

| Ex. | Anionic Composition (A) | Nonionic Composition (B) | | | | Weight Ratio A:B | Gm. Water Removed as Foam | |
|---|---|---|---|---|---|---|---|---|
| | | Compound Polyoxyethylated | Gm. | Gm. Water | Gm. CH$_3$OH | | Fresh | Saline |
| 15 | Example 14 | Dinonyl phenol (8.2) | 200 | 46 | 45 | 1,000:1 | 455 | 345 |
| 16 | do | do | 200 | 46 | 45 | 99:1 | 490 | 365 |
| 17 | do | do | 200 | 46 | 45 | 9:1 | 505 | 380 |
| 18 | do | do | 200 | 46 | 45 | 4:1 | 520 | 355 |
| 19 | do | Dinonyl phenol (17.5) | 200 | 57 | 57 | 1,000:1 | 485 | 335 |
| 20 | do | do | 200 | 57 | 57 | 99:1 | 495 | 365 |
| 21 | do | do | 200 | 57 | 57 | 9:1 | 535 | 405 |
| 22 | do | do | 200 | 57 | 57 | 4:1 | 510 | 415 |
| 23 | do | Dinonyl phenol (27.4) | 200 | 63 | 62 | 1,000:1 | 490 | 345 |
| 24 | do | do | 200 | 63 | 62 | 99:1 | 510 | 365 |
| 25 | do | do | 200 | 63 | 62 | 9:1 | 530 | 405 |
| 26 | do | do | 300 | 63 | 62 | 4:1 | 515 | 425 |
| 27 | Example 5 | Dinonyl phenol (8.2) | 200 | 46 | 45 | ¹99:1 | 490 | 385 |
| 28 | do | do | 200 | 46 | 45 | 32:1 | 510 | 375 |
| 29 | do | do | 200 | 46 | 45 | 13:1 | 510 | 395 |
| 30 | do | do | 200 | 46 | 45 | 9:1 | 490 | 360 |
| 31 | do | do | 200 | 46 | 45 | 17:3 | 500 | 405 |
| 32 | do | do | 200 | 46 | 45 | 4:1 | 510 | 395 |
| 33 | do | Dinonyl phenol (17.5) | 200 | 57 | 57 | 99:1 | 485 | 385 |
| 34 | do | do | 200 | 57 | 57 | 32:1 | 495 | 415 |
| 35 | do | do | 200 | 57 | 57 | 13:1 | 495 | 420 |
| 36 | do | do | 200 | 57 | 57 | 9:1 | 480 | 420 |
| 37 | do | do | 200 | 57 | 57 | 17:3 | 480 | 410 |
| 38 | do | do | 200 | 57 | 57 | 4:1 | 510 | 445 |
| 39 | do | Dinonyl phenol (27.4) | 200 | 63 | 62 | 99:1 | 525 | 365 |
| 40 | do | do | 200 | 63 | 62 | 32:1 | 500 | 410 |
| 41 | do | do | 200 | 63 | 62 | 13:1 | 480 | 410 |
| 42 | do | do | 300 | 63 | 62 | 9:1 | 500 | 405 |
| 43 | do | do | 200 | 63 | 62 | 17:3 | 520 | 430 |
| 44 | do | do | 200 | 63 | 62 | 4:1 | 530 | 440 |

¹ Volume ratio—Examples 27–44.

In addition to blends of an anionic polyoxyalkylated compound and its sulfated derivative, this invention also contemplates the blending of a sulfated polyoxyethylene compound with a different polyoxyethylene compound to give another type of blend of an anionic foaming agent and a nonionic foaming agent. For example, a sulfated polyoxyethylated higher aliphatic alcohol can be blended with a polyoxyethylated alkyl phenol having 8–12 carbons in the alkyl group. Similarly, a sulfated polyoxyethylated alkyl phenol having 8–12 carbon atoms in the alkyl group can be blended with a polyoxyethylated aliphatic alcohol having 12–24 carbons. We have observed that such blends produce under the same conditions greater quantities of foam in both saline and fresh waters, as a general rule, than does the equivalent quantity of the sulfated anionic foaming agent used in the blend of anionic and nonionic foaming agents. The blends of anionic and nonionic foaming agents herein contemplated may contain as low as 1% by weight of the nonionic compound, of the total weight of the anionic and nonionic compounds, while observing an improvement in foaming activity of the blend over its anionic component. The maximum quantity of nonionic foaming compound, based on the total weight of the anionic and nonionic foaming agents, ordinarily will not exceed about 50% by weight.

The nonionic polyoxyethylated compounds used in these blends include polyoxyethylated monoalkyl or dialkyl phenols in which the alkyl group contains 8–12 carbons and polyoxyethylated aliphatic alcohols having 12–24 carbons. These compounds are polyoxyethylated so that they have an average of 5–50 oxyethylene groups per mol of polyoxyethylated compound.

Examples 15–44 in the following table show the foaming activity in fresh and saline waters of various anionic Thus, it will be seen from the foregoing disclosure that this invention provides improvements in the production of foams utilizable in removing water from subterranean areas. The foaming agents of this invention, novel embodiments of which are herein claimed, produce good volumes of foam in both soft and hard waters, a requirement essential for a foaming agent of universal application in the production of foams in well drilling and water removing operations. The concentration of the foaming agents of this invention in the foaming aqueous systems is maintained at a foam-producing quantity in the range of about 0.01–1% by weight, based on the weight of the water in the system, of the active anionic and nonionic foaming ingredients.

The invention is hereby claimed as follows:

1. A process for raising water from a subterranean zone to the surface which comprises mixing with water in said subterranean zone a foam producing quantity of a sulfated, polyoxyethylated monohydric, higher aliphatic alcohol foaming agent, flowing a gas through said subterreanean zone and then to the surface to cause said water to form an aqueous foam and raise said foam to the surface with said gas.

2. The process of claim 1 wherein the foaming agent is a blend of the sulfated, polyoxyethylated monohydric, higher aliphatic alcohol and a polyoxyethylated nonionic foaming agent, the weight of said polyoxyethylated nonionic foaming agent being in the range of 10–40% by weight of said foaming compounds.

3. A process for removing accumulated water from a subterranean gas-bearing zone which comprises adding a foam producing quantity of a sulfated, polyoxyethylated monohydroxy higher aliphatic alcohol foaming agent to the accumulated water, and thereafter causing gas in the formation to flow from the formation to the surface to create an aqueous foam by said gas flow and raise the accumulated water with the gas to the surface in the form of an aqueous foam.

4. In a gas drilling process where subsurface water has invaded the drilling zone in the well bore, the steps of removing drilled solids and water from the drilling zone which comprise adding to the drilling zone a foam producing quantity of a sulfated, polyoxyethylated monohydroxy higher aliphatic alcohol foaming agent, passing compressed gas at high velocity into the drilling zone and thereby creating an aqueous foam, and returning the gas with the foam and entrained solids to the surface through the well bore.

5. A mist drilling process comprising drilling a well bore with a rotary drilling tool, supplying a small amount of water and a foam producing quantity of a sulfated, polyoxyethylated monohydroxy higher aliphatic alcohol foaming agent to the drilling zone, also supplying a gas at high velocity to the drilling zone and thereby creating an aqueous foam, and returning the gas with the foam and entrained solids to the surface through the well bore.

References Cited by the Examiner

UNITED STATES PATENTS

| | | | |
|---|---|---|---|
| 1,970,578 | 8/34 | Schoeller et al. | 252—89 |
| 2,559,574 | 7/51 | Weissberg | 252—353 |
| 2,730,503 | 1/56 | Pressner | 252—89 |
| 2,818,231 | 12/57 | Freeman et al. | 175—68 |
| 2,877,187 | 3/59 | Henderson et al. | 252—89 |
| 2,945,818 | 7/60 | Costine et al. | 252—353 |
| 2,978,409 | 4/61 | Greenwald et al. | 252—8.55 |
| 2,999,551 | 9/61 | Murphy | 175—68 |
| 3,073,387 | 1/63 | Dunning et al. | 166—45 |
| 3,111,178 | 11/63 | Marsh et al. | 175—69 |
| 3,111,998 | 11/63 | Crowley | 175—68 |

FOREIGN PATENTS

| | | |
|---|---|---|
| 709,515 | 5/54 | Great Britain. |
| 719,445 | 12/54 | Great Britain. |
| 759,877 | 10/56 | Great Britain. |
| 833,146 | 4/60 | Great Britain. |

OTHER REFERENCES

Barker, G. E.: Non-Ionic Detergents in Soap and Sanitary Chemicals, June 1948, pp. 46 to 48 and 65.

Murray et al.: Water Still Poses Tough Problem in Drilling With Air, Article in the Oil and Gas Journal, vol. 55, June 10, 1957, pp. 105, 107, 110 and 111.

Randall et al.: Stearates, Foaming Agents Combat Water in Air or Gas Drilling, article in the Oil and Gas Journal, Nov. 3, 1958, pp. 78 to 83.

Gray Chemicals in Drilling Mud, article in the Oil and Gas Journal, vol. 56, December 1958, page 97.

CHARLES E. O'CONNELL, *Primary Examiner.*

JOSEPH R. LIBERMAN, JULIUS GREENWALD, *Examiners.*